United States Patent
Brookes et al.

(10) Patent No.: US 7,184,957 B2
(45) Date of Patent: Feb. 27, 2007

(54) MULTIPLE PASS SPEECH RECOGNITION METHOD AND SYSTEM

(75) Inventors: John R. Brookes, Oakland, CA (US); Norikazu Endo, Sunnyvale, CA (US)

(73) Assignee: Toyota InfoTechnology Center Co., Ltd., Tokyo (JP)

( * ) Notice: Subject to any disclaimer, the term of this patent is extended or adjusted under 35 U.S.C. 154(b) by 943 days.

(21) Appl. No.: 10/269,269

(22) Filed: Oct. 10, 2002

(65) Prior Publication Data

US 2004/0059575 A1    Mar. 25, 2004

Related U.S. Application Data

(60) Provisional application No. 60/413,958, filed on Sep. 25, 2002.

(51) Int. Cl.
*G10L 15/00*    (2006.01)

(52) U.S. Cl. ................................ 704/246; 704/275

(58) Field of Classification Search ................ 704/246, 704/275
See application file for complete search history.

(56) References Cited

U.S. PATENT DOCUMENTS

| | | | | |
|---|---|---|---|---|
| 6,112,174 | A * | 8/2000 | Wakisaka et al. | 704/251 |
| 6,144,989 | A | 11/2000 | Hodjat et al. | |
| 6,324,513 | B1 * | 11/2001 | Nagai et al. | 704/275 |
| 7,058,573 | B1 * | 6/2006 | Murveit et al. | 704/229 |
| 2002/0072917 | A1 | 6/2002 | Irvin et al. | |
| 2002/0111810 | A1 | 8/2002 | Khan et al. | |
| 2002/0128837 | A1 | 9/2002 | Morin | |
| 2002/0169611 | A1 | 11/2002 | Guerra et al. | |
| 2003/0036907 | A1 | 2/2003 | Stewart et al. | |
| 2003/0105639 | A1 | 6/2003 | Naimpally et al. | |
| 2003/0125869 | A1 | 7/2003 | Adams | |
| 2003/0182054 | A1 | 9/2003 | Peterson et al. | |

FOREIGN PATENT DOCUMENTS

JP    10-97285 A    4/1998

(Continued)

OTHER PUBLICATIONS

International Search Report dated Jan. 13, 2004 for International Application No. PCT/JP03/12169.

(Continued)

*Primary Examiner*—Daniel Abebe
(74) *Attorney, Agent, or Firm*—Fenwick & West LLP

(57) ABSTRACT

A multiple pass speech recognition method includes a first pass and a second pass. The first pass recognizes an input speech signal to generate a first pass result. The second pass generates a first grammar having a portion set to match a first part of the input speech signal, based upon the context of the first pass result, and generate a second pass result. The method may further include a third pass grammar limiting the second part of the input speech signal to the second pass result. The third pass grammar includes a model corresponding to the first part of the input speech signal and varying within the second pass result. The third pass compares the first part of the input speech signal to the model while limiting the second part of the input speech signal to the second pass result.

35 Claims, 8 Drawing Sheets

FOREIGN PATENT DOCUMENTS

| | | |
|---|---|---|
| JP | P2000-181485 A | 6/2000 |
| JP | P2001-14165 A | 1/2001 |
| JP | P2001-195087 A | 7/2001 |
| JP | 2002-318136 A | 10/2002 |
| JP | 2003-4470 A | 1/2003 |

OTHER PUBLICATIONS

International Search Report dated Apr. 26, 2005 for International Application No. PCT/JP2005/000428.

Written Opinion of the International Searching Authority dated Apr. 26, 2005 for International Application No. PCT/JP2005/000428.

* cited by examiner

MULTIPLE PASS SPEECH RECOGNITION METHOD AND SYSTEM

CROSS-REFERENCE TO RELATED APPLICATIONS

This application claims priority under 35 U.S.C. §119(e) to co-pending U.S. Provisional Patent Application No. 60/413,958, entitled "Multiple Pass Speech Recognition Method and System," filed on Sep. 25, 2002, the subject matter of which is incorporated by reference herein in its entirety.

TECHNICAL FIELD

The present invention relates generally to speech recognition, and more specifically, to a multiple pass speech recognition method and system in which speech is processed by the speech recognition system multiple times for more efficient and accurate speech recognition.

BACKGROUND OF THE INVENTION

Speech recognition systems have received increased attention lately and are becoming popular. Speech recognition technology is being used more and more in a wide range of technology areas ranging from security systems and automated response systems to a variety of electronic devices such as computers.

Conventional speech recognition systems are also used in car navigation systems as a command input device. Previously, users of car navigation systems typically entered the destination address and other control information into the car navigation system using text input devices such as a keyboard or a touch sensitive screen. However, these text input devices are inconvenient and dangerous to use when driving the car, since they require visual interaction with the driver and thus interfere with the driver's ability to drive. In contrast, speech recognition systems are more convenient and safer to use with car navigation systems, since they do not require visual interaction for the driver when commands are input to the car navigation system.

Conventional speech recognition systems typically attempted to recognize speech by processing the speech with the speech recognition system once and analyzing the entire speech based on a single pass. These conventional speech recognition systems had a disadvantage that they had a high error rate and frequently failed to recognize the speech or incorrectly recognized the speech. As such, car navigation systems using such conventional speech recognition systems would frequently fail to recognize the speech or incorrectly recognize the speech, leading to wrong locations or providing unexpected responses to the user.

Therefore, there is a need for an enhanced speech recognition system that can recognize speech reliably and accurately.

SUMMARY OF INVENTION

The present invention provides a multiple pass speech recognition method that includes at least a first pass and a second pass, according to an embodiment of the present invention. The multiple pass speech recognition method initially recognizes input speech using a speech recognizer to generate a first pass result. In one embodiment, the multiple pass speech recognition method determines the context of the speech based upon the first pass result and generates second pass grammar to be applied to the input speech in the second pass. The second pass grammar has a first portion set to match a first part of the input speech and a second portion configured to recognize a second part of the speech to generate a second pass result. In another embodiment of the present invention, the context of the speech in the first pass result may identify a particular level in a knowledge hierarchy. The second pass grammar will have a level in the knowledge hierarchy higher than the level of the first pass result.

In another embodiment of the present invention, the multiple pass speech recognition method of the present invention further includes a third pass, in addition to the first and second passes, and thus generates a third pass grammar limiting the second part of the speech to the second pass result and having a third pass model corresponding to the first part of the speech with variations within the second pass result. The multiple pass speech recognition method of the present invention applies the third pass grammar to the input speech by comparing the first part of the speech to the third pass model and limiting the second part of the speech to the second pass result. The third pass result is output as the final result of the multiple pass speech recognition method. In still another embodiment of the present invention, the third pass grammar and the third pass model may have a level in the knowledge hierarchy lower than both the level of the first pass result and the level of the second pass grammar.

The multiple pass speech recognition method provides a very accurate method of speech recognition, because the method recognizes speech multiple times in parts and thus the intelligence of the multiple pass speech recognition method is focused upon only a part of the speech at each pass of the multiple pass method. The multiple pass speech recognition method also has the advantage that the intelligence and analysis gathered in the previous pass can be utilized by subsequent passes of the multiple pass speech recognition method, to result in more accurate speech recognition results.

The multiple pass speech recognition method of the present invention can be embodied in software stored on a computer readable medium or hardware including logic circuitry. The hardware may be comprised of a stand-alone speech recognition system or a networked speech recognition system having a server and a client device. Intelligence of the networked speech recognition system may be divided between the server and the client device in any manner.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
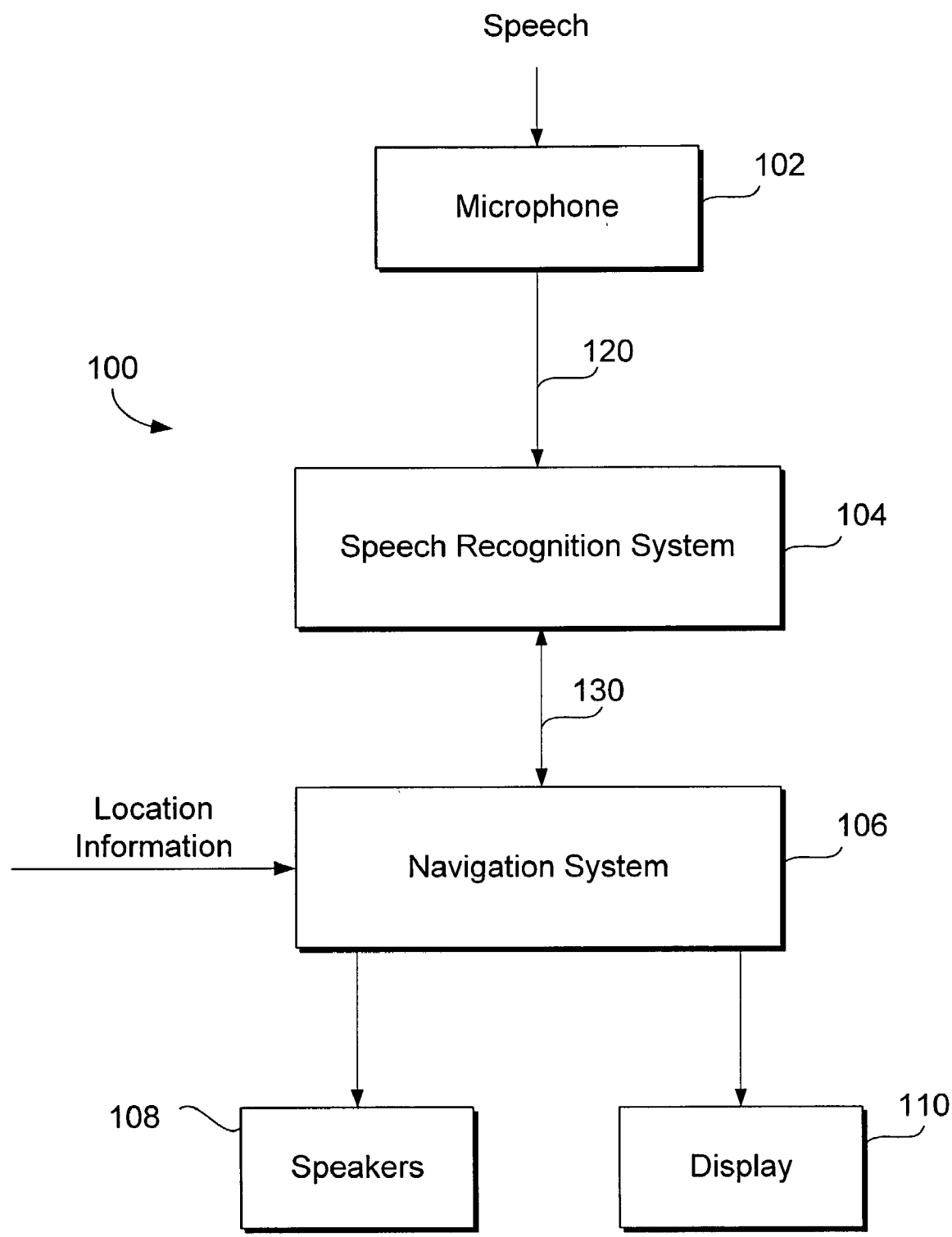
FIG. 1 is a block diagram illustrating a system using a speech recognition system according to one embodiment of the present invention.

The embodiments of the present invention will be described below with reference to the accompanying drawings. Like reference numerals are used for like elements in the accompanying drawings.

FIG. 1 is a block diagram illustrating a system 100 according to an embodiment of the present invention. This embodiment of the system 100 preferably includes a microphone 102, a speech recognition system 104, a navigation system 106, speakers 108 and a display device 110. The system 100 uses the speech recognition system 104 as an input device for the vehicle navigation system 106. FIG. 1 shows an example of how the speech recognition system of the present invention can be used with vehicle navigation systems. However, it should be clear to one skilled in the art that the multiple pass speech recognition system and method of the present invention can be used independently or in combination with any type of device and that its use is not limited to vehicle navigation systems.

Referring to FIG. 1, the microphone 102 receives speech commands from a user (not shown) and converts the speech to an input speech signal and passes the input speech signal to the speech recognition system 104 according to an embodiment of the present invention. The speech recognition system 104 is a multiple pass speech recognition system in which the input speech signal is analyzed multiple times in parts according to an embodiment of the present invention. Various embodiments of the multiple pass speech recognition method will be explained in detail below with reference to FIGS. 3 and 4A–4C.

The speech recognition system 104 is coupled to the vehicle navigation system 106 that receives the recognized speech as the input command. The speech recognition system 104 is capable of recognizing the input speech signal and converting the recognized speech to corresponding control signals for controlling the vehicle navigation system 106. The details of converting a speech recognized by the speech recognition system 104 to control signals for controlling the vehicle navigation system 106 are well known to one skilled in the art and a detailed description is not necessary for an understanding of the present invention. The vehicle navigation system 106 performs the commands received from the speech recognition system 104 and outputs the result on either the display 110 in the form of textual or graphical illustrations or the speakers 108 as sound. The navigation system 106 may also receive location information such as GPS (Global Positioning System) information and use the location information to show the current location of the vehicle on the display 100. The location information can also be used by the speech recognition system 104 to enhance the performance of the speech recognition system 104, as will be explained in detail below with reference to FIGS. 4B and 4C.

For example, the input speech signal entered to the speech recognition system 104 may be an analog signal from the microphone 102 that represents the phrase "Give me the directions to 10 University Avenue, Palo Alto." The speech recognition system 104 of the present invention analyzes the input speech signal and determines that the speech is an instruction to the navigation system 106 to give directions to 10 University Avenue, Palo Alto. The navigation system 106 uses conventional methods to process the instructions and gives the directions on the display 110 in the form of textual or graphical illustrations or on the speakers 108 as synthesized sound.

Figure 2A:
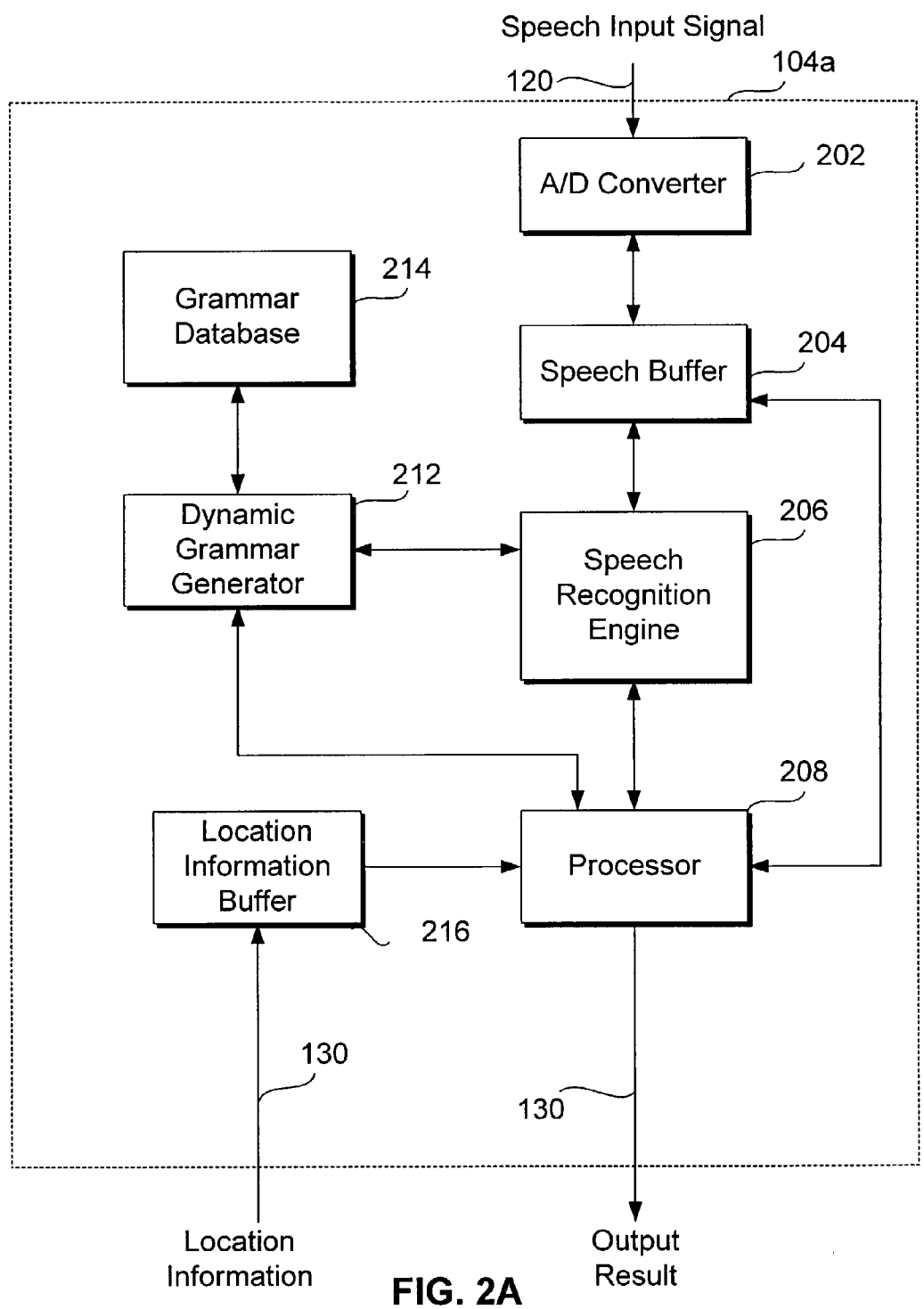
FIG. 2A is a block diagram illustrating a stand-alone speech recognition system according to a first embodiment of the present invention.

FIG. 2A is a block diagram illustrating a stand-alone speech recognition system 104a according to an embodiment of the present invention. In the embodiment illustrated in FIG. 2A, all of the functions and intelligence needed by the speech recognition system 104a reside in the speech recognition system 104a itself and, as such, there is no need to communicate with a server. For example, the speech recognition system 104a illustrated in FIG. 2A may be present in a car that is not networked to a server. All the speech recognition functions are carried out in the speech recognition system 104a itself.

Referring to FIG. 2A, the speech recognition system 104a includes an A/D (Analog-to-Digital) converter 202, a speech buffer 204, a speech recognition engine 206, a processor 208, a dynamic grammar generator 212, a grammar database 214, and a location information buffer 216. The A/D converter 202 has an input that is coupled to and receives an input speech signal from an external source such as a microphone 120 via line 120 and converts the received input speech signal to digital form so that speech recognition can be performed. The speech buffer 204 temporarily stores the digital input speech signal while the speech recognition system 104a recognizes the received speech. The speech buffer 204 may be any type of rewritable memory, such as flash memory, dynamic random access memory (DRAM), or static random access memory (SRAM), or the like. The speech recognition engine 206 receives the stored digital input speech signal from speech buffer 204 and performs the multiple pass speech recognition method of the present invention on the speech in cooperation with the dynamic grammar generator 212 and the processor 208 to recognize the speech. The multiple pass speech recognition method of the present invention will be illustrated in detail with reference to FIGS. 3 and 4A–4C below.

The grammar database 214 stores various grammars (or models) and associated information such as map information for use by the dynamic grammar generator 212 and the speech recognition engine 206 in the multiple pass speech recognition method of the present invention. The grammar database 214 can be stored in any type of storage device, such as hard disks, flash memories, DRAMs, or SRAMs, and the like.

The dynamic grammar generator 212 retrieves and/or generates the appropriate grammar (model) for use in the speech recognition engine 206 in accordance with the various stages (passes) of the multiple pass speech recognition method of the present invention. The dynamic grammar generator 212 can be any type of logic circuitry or processor capable of retrieving, generating, or synthesizing the appropriate grammar (model) for use in the corresponding stages of the multiple pass speech recognition method of the present invention. The dynamic grammar generator 212 is coupled to the speech recognition engine 206 to provide the appropriate grammar in each pass of the multiple pass speech recognition method of the present invention to the speech recognition engine 206. The dynamic grammar generator 212 is also coupled to the processor 208 so that it can receive control signals for generating the appropriate grammar in each pass of the multiple pass speech recognition method from the processor 208.

The processor 208 operates in cooperation with the speech recognition engine 206 to perform the multiple pass speech recognition method of the present invention on the input speech signal and outputs the final result of the speech recognition. For example, the processor 208 may weigh the speech recognition results output from the speech recognition engine 206 according to predetermined criteria and determine the most probable result to be output from the speech recognition system 104a. The processor 208 also controls the various operations of the components of the client device 104a, such as the A/D converter 202, the speech buffer 204, the speech recognition engine 206, the dynamic grammar generator 212, the grammar database 214, and the location information buffer 216.

In another embodiment of the present invention, the processor 208 may have the capabilities of segmenting only a part of the digital input speech signal stored in the speech buffer 204 and inputting only the segmented part to the speech recognition engine 206. In such case, the processor 208 also controls the dynamic grammar generator 212 to generate grammar that corresponds to only the segmented part of the speech.

The location information buffer 216 receives location information such as GPS information from an external source such as the navigation system 106 having a GPS sensor (not shown) via line 130 and stores the location information for use by the processor 208 in the multiple pass speech recognition method of the present invention. For example, the location information stored in the location information buffer 216 may be used by the processor 208 as one of the criteria in weighing the speech recognition results output from the speech recognition engine 206 and determining the most probable result(s) to be output from the speech recognition system 104a. The details of how the processor 208 weighs the speech recognition results output from the speech recognition engine 206 or how the location information stored in the location information buffer 208 is utilized by the processor 208 in weighing the speech recognition results will be explained in detail below with reference to FIGS. 3 and 4A–4C.

The speech recognition system 104a illustrated in FIG. 2A has the advantage that all the functions of the speech recognition system 104a reside in a self-contained unit. Thus, there is no need to communicate with other servers or databases in order to obtain certain data or information or perform certain functions of the multiple pass speech recognition method of the present invention. In other words, the speech recognition system 104a is a self-standing device and does not need to be networked with a server.

Figure 2B:
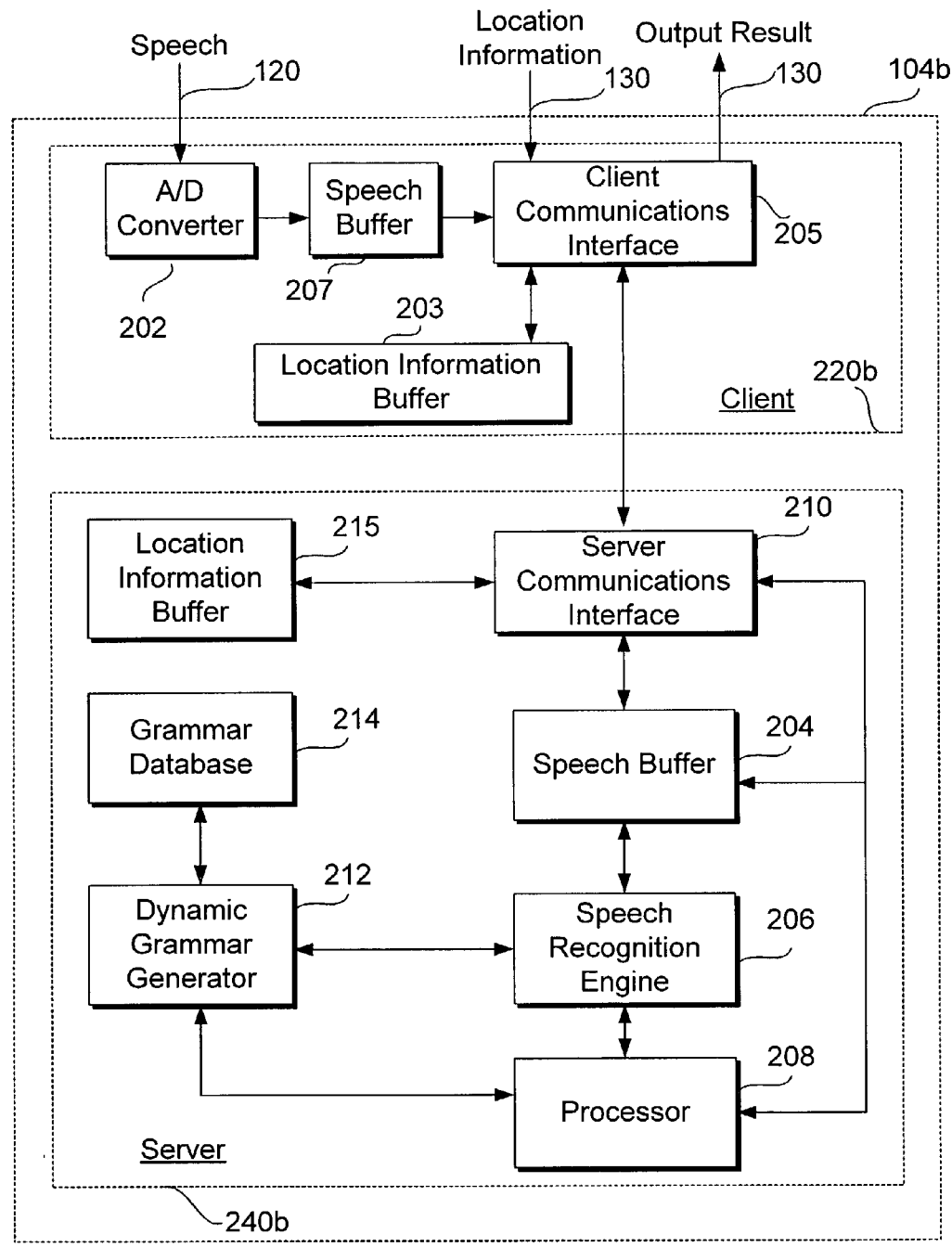
FIG. 2B is a block diagram illustrating a client device and a server in a networked speech recognition system according to a second embodiment of the present invention.

FIG. 2B is a block diagram illustrating a second embodiment of the networked speech recognition system 104b comprising a client device 220b and a server 240b. The speech recognition system 104b described in FIG. 2B is different from the speech recognition system 104a in FIG. 2A in that the speech recognition system 104b is distributed computationally between a client device 220b and a server 240b with most of the intelligence of the speech recognition system 104b residing in the server 240b. For example, the client device 220b can be a thin device located in a networked vehicle that merely receives an analog input speech signal from a driver via the microphone 102, and most of the multiple pass speech recognition method of the present invention is performed in the server 240b after receiving the speech information from the client device 220b.

Referring to FIG. 2B, the client device 220b includes an AID converter 202, a speech buffer 207, a location information buffer 203, and a client communications interface 205. The A/D converter 202 receives an input speech signal from an external source such as a microphone 102 and converts the received input speech signal to digital form so that speech recognition can be performed. The speech buffer 207 temporarily stores the digital input speech signal while the speech recognition system 104b recognizes the speech. The speech buffer 207 may be any type of rewritable memory, such as flash memory, dynamic random access memory (DRAM), or static random access memory (SRAM), or the like. The location information buffer 203 receives location information such as GPS information received from the an external source such as the navigation system 106 including a GPS sensor (not shown) and stores the location information for use by the speech recognition system 104b in the multiple pass speech recognition method of the present invention.

The client communications interface 205 enables the client device 220b to communicate with the server 240b for distributed computation for the multiple pass speech recognition method of the present invention. The client communications interface 205 also enables the client device 220b to communicate with the navigation system 106 to output the speech recognition results to the navigation system 106 in the form of converted command signals and to receive various information such as location information from the navigation system 106. The client device 220b transmits the digital speech signal stored in the speech buffer 207 and the location information stored in the location information buffer 203 to the server 240b via the client communications interface 205 to carry out the multiple pass speech recognition method of the present invention. The client device 220b also receives the result of the multiple pass speech recognition method of the present invention from the server 240b via the client communications interface 205. The client communications interface 205 is preferably a wireless communications interface, such as a cellular telephone interface or satellite communications interface. However, it should be clear to one skilled in the art that any type of communications interface can be used as the client communications interface 205.

The server 240b includes a server communications interface 210, a speech buffer 204, a speech recognition engine 206, a processor 208, a location information buffer 215, a grammar database 214, and a dynamic grammar generator 212. The server 240b receives the speech and/or location information from the client device 220b via the server communications interface 210 and carries out the multiple pass speech recognition method according to the present invention. Upon completion of the speech recognition, the server 240b transmits the result back to the client device 220b via the server communications interface 210. The server communications interface 210 is also preferably a wireless communications interface, such as a cellular telephone interface or satellite communications interface. However, it should be clear to one skilled in the art that any type of communications interface can be used as the server communications interface 210.

The speech buffer 204 stores the speech received from the client device 220b while the server 240b performs the multiple pass speech recognition method of the present invention. The location information buffer 215 also stores the location information received from the client device 220b while the server 240b performs the multiple pass speech recognition method of the present invention. The speech recognition engine 206, the processor 208, the grammar database 214, and the dynamic grammar generator 212 perform the same functions as those components described with reference to FIG. 2A, except that they are located in the server 240b rather than in the client device 220b.

The speech recognition system 104b illustrated in FIG. 2B has the advantage that the client device 220b has a very simple hardware architecture and can be manufactured at a very low cost, since the client device 220b does not require complicated hardware having much intelligence and most of the intelligence for the multiple pass speech recognition method of the present invention reside in the server 240b. Thus, such client devices 220b are appropriate for low-end client devices used in networked speech recognition systems 104b. In addition, the speech recognition system 104b may be easily upgraded by upgrading only the components in the server 240b, since most of the intelligence of the speech recognition system 104b resides in the server 240b.

Figure 2C:
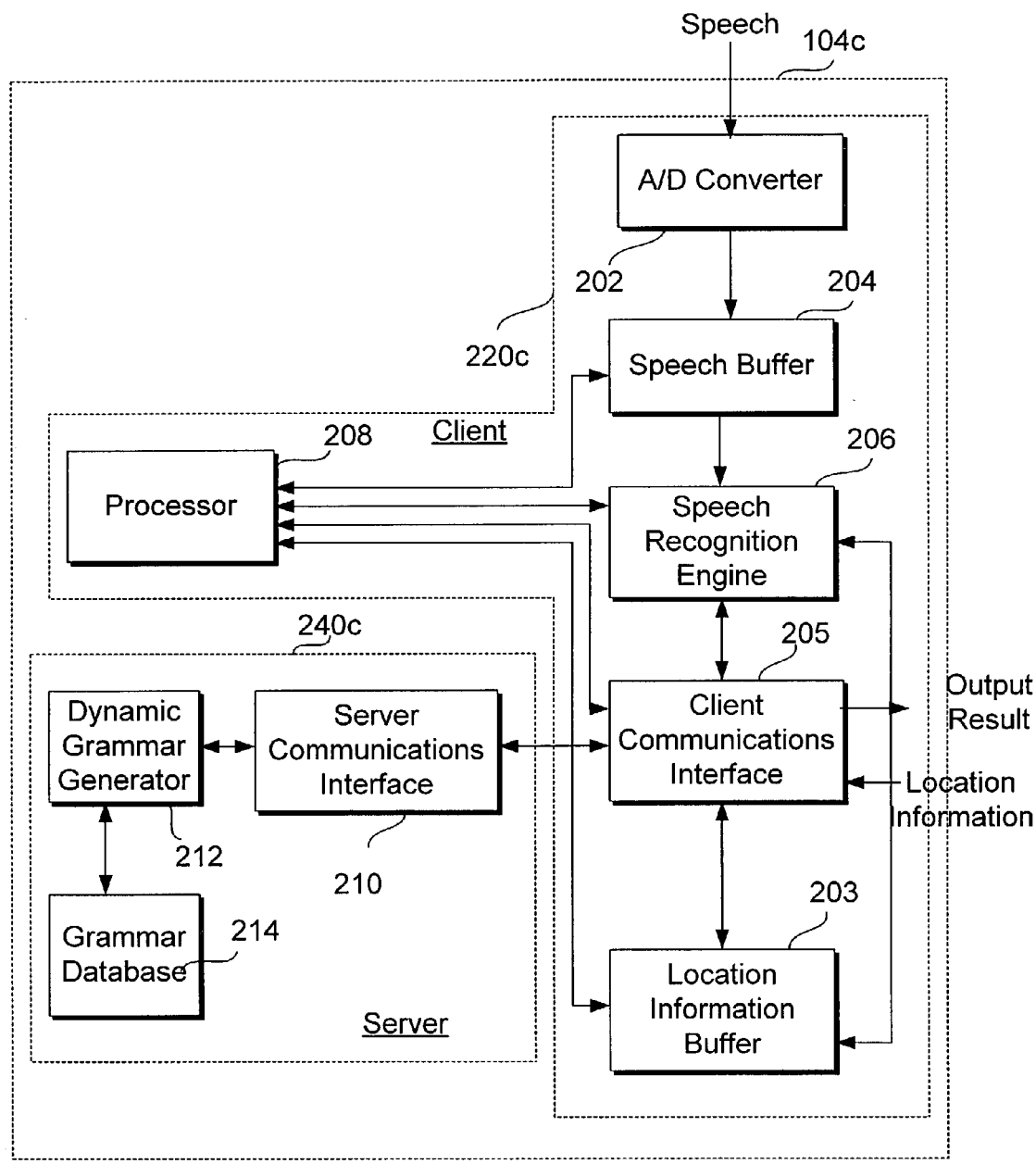
FIG. 2C is a block diagram illustrating a client device and a server in a networked speech recognition system according to a third embodiment of the present invention.

FIG. 2C is a block diagram illustrating a speech recognition system 104c comprising a client device 220c and a server 240c according to still another embodiment of the present invention. The speech recognition system 104c described in FIG. 2C is different from the speech recognition systems 104a and 104b illustrated in FIGS. 2A and 2B, respectively, in that the speech recognition system 104c is a networked system having a client device 220c and a server 240c and that the intelligence of the speech recognition system 104 is divided between the client device 220c and the server 240c. For example, the client device 220c may be located in a networked vehicle that receives an input speech signal from a driver via a microphone 102 and performs part of the functions of the multiple pass speech recognition method of the present invention, and the server 240c may perform the remaining parts of the functions of the multiple pass speech recognition method of the present invention. It should be clear to one skilled in the art that the manner in which the intelligence of the networked speech recognition system 104c is divided between the client device 220c and the server 240c can be modified in a number of different ways.

Referring to FIG. 2C, the client device 220c includes an A/D converter 202, a speech buffer 204, a speech recognition engine 206, a location information buffer 203, and a client communications interface 205. The A/D converter 202 receives an input speech signal from an external source such as a microphone 102 and converts the received speech to digital form so that speech recognition can be performed. The speech buffer 204 stores the digital speech signal while the speech recognition system 104c recognizes the speech. The speech buffer 204 may be any type of rewritable memory, such as flash memory, dynamic random access memory (DRAM), or static random access memory (SRAM), or the like. The location information buffer 203 receives location information such as GPS information from an external source such as a navigation system 106 including a GPS sensor (not shown) via the client communications interface 205 and stores the location information for use by the speech recognition system 104c in the multiple pass speech recognition method of the present invention.

The speech recognition engine 206, the location information buffer 203, and the processor 208 perform the same functions as those components described with respect to FIG. 2A except that they operate in conjunction with a grammar database 214 and a dynamic grammar generator 212 located in a server 240c rather than in the client device 220c itself. The client communications interface 205 enables the client device 220c to communicate with the server 240c.

The client device 220c communicates with the server 240c via the client communications interface 205 in order to request the server 240c to generate or retrieve the appropriate grammar at various stages of the multiple pass speech recognition method and receive such generated grammar from the server 240c. The client communications interface 205 is preferably a wireless communications interface, such as a cellular telephone interface or satellite communications interface. However, it should be clear to one skilled in the art that any type of communications interface can be used as the client communications interface 205.

The server 240c includes a server communications interface 210, a grammar database 214, and a dynamic grammar generator 212. The server 240c receives a request to retrieve or generate appropriate grammar at various stages (passes) of the multiple pass speech recognition method of the present invention and transmits such retrieved or generated grammar from the server 240c to the client device 220c via the server communications interface 210. The dynamic grammar generator 212 and the grammar database 214 perform the same functions as those components described with respect to FIG. 2A except that they are located in a server 240c rather than in the client device 220c itself and operate in conjunction with the client device 220c via the server communications interface 210.

In the embodiment illustrated in FIG. 2C, the grammar database 214 and the dynamic grammar generator 212 are located in the server 240c rather than in individual client devices 220 to reduce the costs of manufacturing the speech recognition system 104c, since grammar information requires a lot of data storage space and thus results in high costs for manufacturing the client devices or makes it impractical to include in low-end client devices. Furthermore, the intelligence in the speech recognition system 104c of the present invention can be divided between the server 240c and the client devices 220c in many different ways depending upon the allocated manufacturing cost of the client devices. Thus, the speech recognition system 104 of the present invention provides flexibility in design and cost management. In addition, the grammar database 214 or the dynamic grammar generator can be easily upgraded, since they reside in the server 240c.

Figure 3:
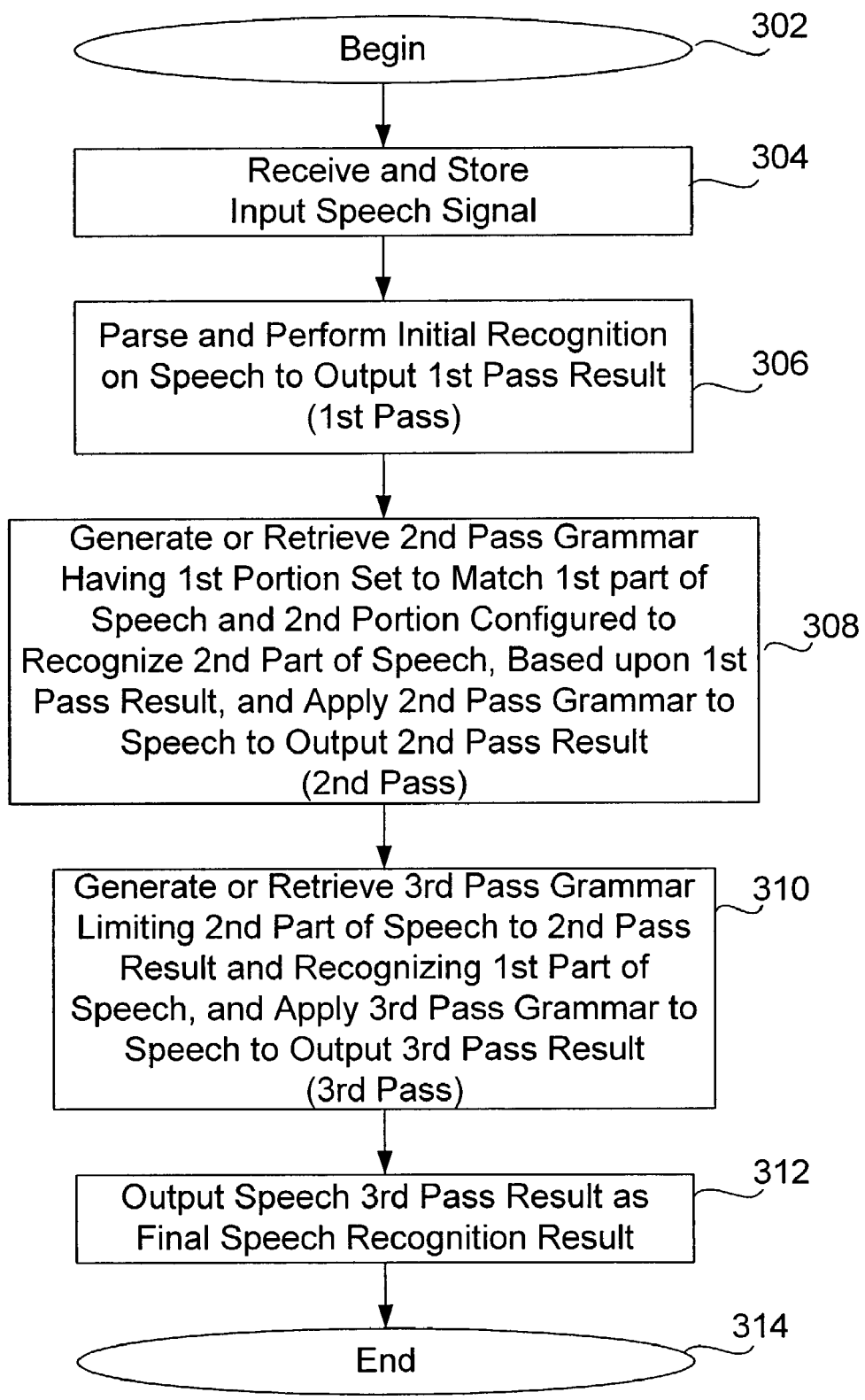
FIG. 3 is a flowchart illustrating a multiple pass speech recognition method according to one embodiment of the present invention.

FIG. 3 is a flowchart illustrating a multiple pass speech recognition method according to an embodiment of the present invention. As the process begins 302, the speech recognition system 104 receives and stores 304 an input speech signal from an external source such as a microphone 102. The A/D converter 202 and the speech buffer 204 receive and store the input speech signal. Step 302 is typically carried out in client devices if the speech recognition system 104 is a networked speech recognition system. The speech is parsed 306 into a few parts and initial speech recognition is performed 306 using a conventional speech recognizer. The parsed speech will have a recognized text and be correlated to certain time points of the input speech signal waveform. Step 306 is referred to as the first pass of the multiple pass speech recognition method according to the present invention. The conventional speech recognizer (not shown) may be any state-of-the-art speech recognizer known in the art, and its functions are performed by the combined operation of the speech recognition engine 206, the processor 208, the dynamic grammar generator 212, and the grammar database 214 in the present invention. The operations of a conventional speech recognizer are well known to one skilled in the art and a detailed explanation of the operations of a conventional speech recognizer is not necessary for an understanding of the present invention.

The speech parsed and recognized in step 306 is output 306 as the first pass result of the multiple pass speech recognition method according to the present invention. The first pass result is an initial result of speech recognition and is used as a model to generate or retrieve appropriate grammar in the second pass of the multiple pass speech recognition method of the present invention, which will be explained in more detail with reference to FIGS. 4A and 4B.

The first pass result is used by the dynamic grammar generator 212 to generate or retrieve 308 appropriate grammar to be applied 308 to the speech in the second pass 308 of the multiple pass speech recognition method of the present invention. The grammar for the second pass has a first portion set to match a first part of the speech and a second portion configured to recognize a remaining second part of the speech using a conventional speech recognizer. The second pass grammar is retrieved or generated by the dynamic grammar generator 212 using the grammar or information stored in the grammar database 214. The second pass grammar thus generated or retrieved is applied to the stored input speech signal by the speech recognition engine 206 in cooperation with the processor 208. The details of generating or retrieving the grammar for the second pass and application of such grammar to the speech will be explained in more detail with reference to FIG. 4B below. The result of the second pass is output 308 for use in generating or retrieving appropriate grammar for the third pass of the multiple pass speech recognition method of the present invention.

The dynamic grammar generator 212 generates or retrieves 310 appropriate grammar for use in the third pass of the multiple pass speech recognition method of the present invention, based upon the second pass result. The third pass grammar limits the second part of the speech to the second pass result, and attempts to recognize the first part of the speech. The third pass grammar is retrieved or generated by the dynamic grammar generator 212 as well, using the grammar or information stored in the grammar database 214. The third pass grammar thus generated or retrieved is applied to the speech by the speech recognition engine 206 in cooperation with the processor 208. The details of generating or retrieving the third pass grammar and application of such grammar to the speech will be explained in more detail with reference to FIG. 4C below. The third pass result is output 312 as the final speech recognition result and the process ends 314.

Figure 4A:
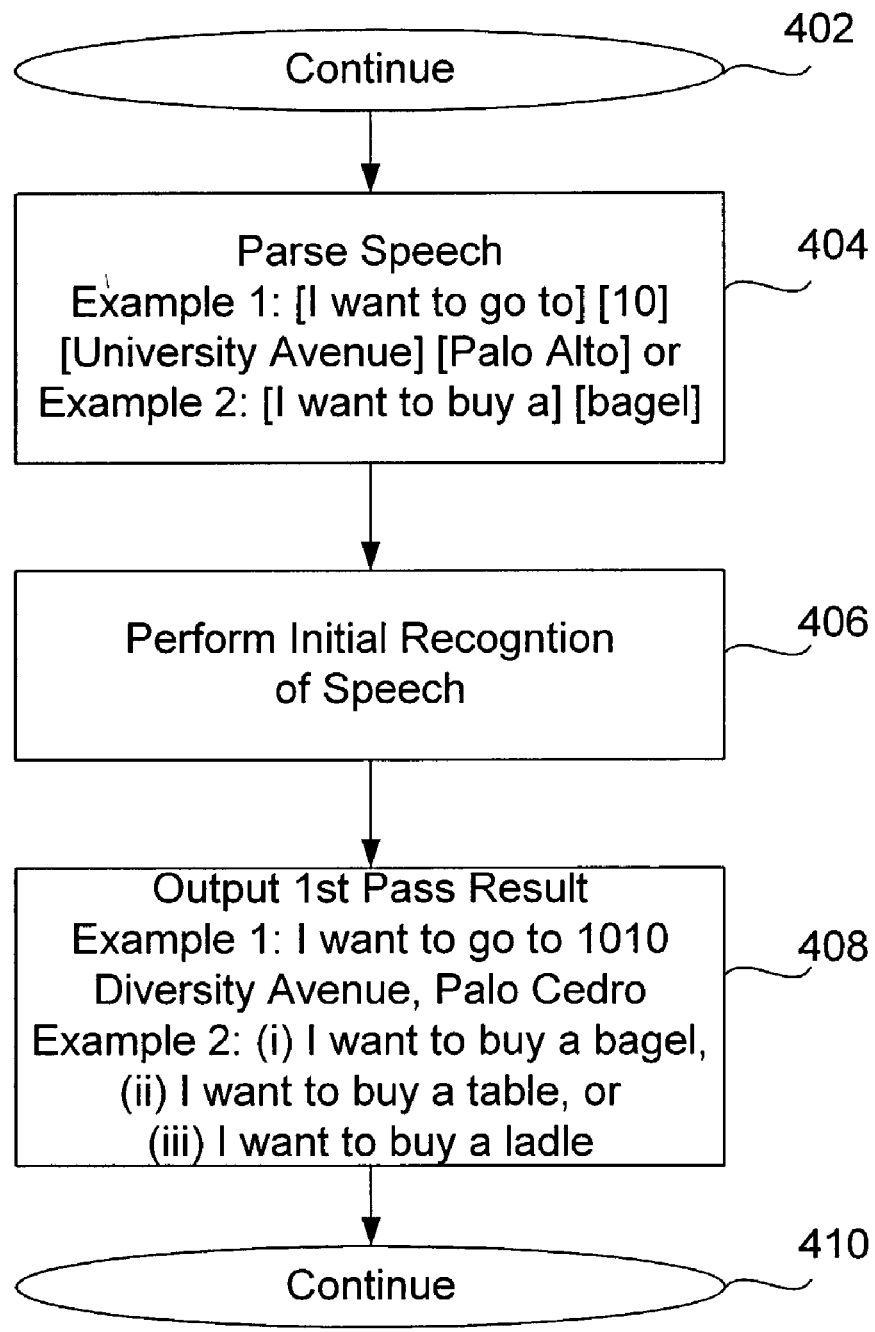
FIG. 4A is a flowchart illustrating in more detail the first pass of the multiple pass speech recognition method according to one embodiment of the present invention.

FIG. 4A is a flowchart illustrating in more detail the first pass 306 of the multiple pass speech recognition method according to an embodiment of the present invention. The flow charts of FIGS. 4A–4C use two examples in which the speech received for recognition is "I want to go to 10 University Avenue, Palo Alto" (the first example) or "I want to buy a bagel" (the second example) in order to demonstrate how the multiple pass speech recognition system of the present invention processes and analyzes the speech.

As the process continues 402 after the input speech signal is received and stored 302, the input speech signal is parsed 404 into several parts based upon analysis of the sound of the speech using a conventional speech recognizer. Typically, sounds of human speech contain short silence between words, phrases, or clauses, so that a conventional speech recognizer can discern such silence and parse the speech. For example, the speech of "I want to go to 10 University Avenue, Palo Alto" in the first example can be parsed into four parts [I want to go to], [10], [University Avenue], and [Palo Alto]. Likewise, the speech of "I want to buy a bagel" in the second example can be parsed into two parts [I want to buy a], [bagel].

Then, initial recognition of the parsed speech is performed 406, using a conventional speech recognizer and outputs 408 the result as the first pass result. The result may include one or more initial recognitions. Conventional speech recognizers typically have a high error rate in speech recognition. Thus, the first pass results of the initial speech recognition 406 are typically a close but inaccurate result. For example, the first pass result for the first example may be an inaccurate result such as "I want to go to 1010 Diversity Avenue, Palo Cedro" as the speech recognition result for the input speech "I want to go to 10 University Avenue, Palo Alto." The first pass result for the second example may include three estimates, such as "I want to buy a bagel," "I want to buy a table," and "I want to buy a ladle" as the speech recognition result for the input speech "I want to buy bagel."

The details of parsing and recognizing speech using a conventional speech recognizer as described above is well known in the art and a detailed explanation of parsing and recognizing speech is not necessary for un understanding of the present invention. Conventional speech recognizers also provide defined points of starting and stopping a sound waveform corresponding to the parsing. The parsing and speech recognition functions of the conventional speech recognizer may be performed by the speech recognition engine 206 in cooperation with the processor 208 of the present invention.

Figure 4B:
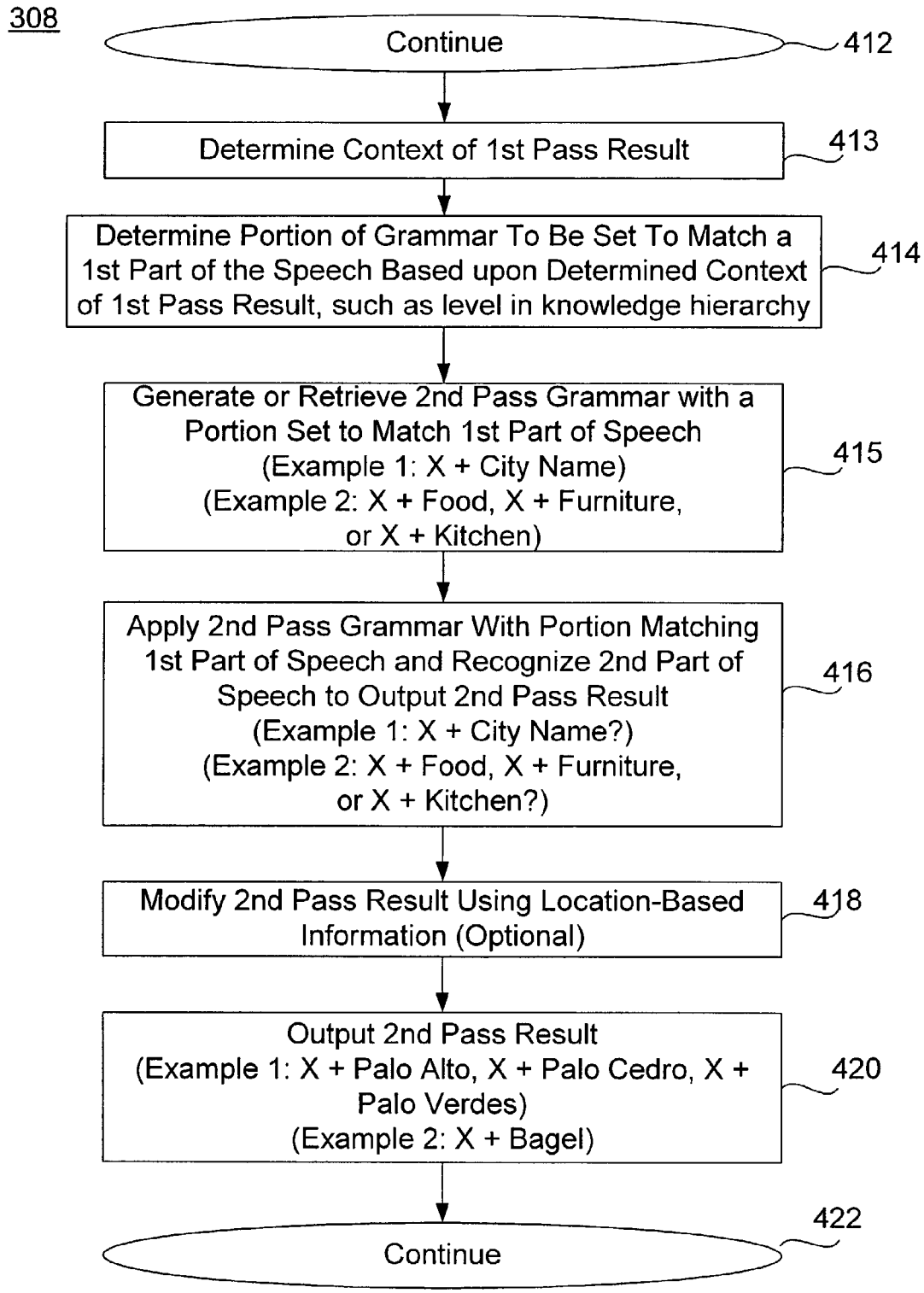
FIG. 4B is a flowchart illustrating in more detail the second pass of the multiple pass speech recognition method according to one embodiment of the present invention.

FIG. 4B is a flowchart illustrating in more detail the second pass 308 of the multiple pass speech recognition method according to an embodiment of the present invention. The second pass receives the first pass result to generate or retrieve appropriate grammar for the second pass and applies the second pass grammar to the speech.

Referring to FIG. 4B, as the process continues 412, the dynamic grammar generator 212 determines 413 the context of the speech recognized in the first pass. The dynamic grammar generator 212 determines 414 a portion of the grammar to be set to match a first part of the input speech based upon the determined context of the first pass result. Then, the dynamic grammar generator 212 generates or retrieves 415 the second pass grammar having the portion set to match the first part of the input speech and attempting to recognize a second part of the input speech.

Such determination of the context of the recognized speech in step 413 and using such determination to determine a portion of the grammar to be set to match a first part of the speech in step 414 may be done based upon pre-existing knowledge about speeches, such as ontological knowledge or information on knowledge hierarchy. For example, the dynamic grammar generator 212 can determine that the first pass result "I want to go to 1010 Diversity Avenue, Palo Cedro" for the first example is a speech asking for directions to a location with a particular address. Typically, statements asking for directions have a phrase such as "I want to go to," "Give me the directions to," "Where is," or "Take me to" at the beginning of such statements, followed by a street number, street name, and city name. Also, since geographical information is typically hierarchical, it is more efficient for the speech recognition system to recognize the word at the top of the hierarchy first (e.g., city name in the example herein). Thus, the dynamic grammar generator 212 will use pre-existing knowledge about such statements asking for directions to generate appropriate grammar for the second pass according to one embodiment of the present invention. Specifically with respect to the example herein, the dynamic grammar generator 212 generates 415 or retrieves 415 from the grammar database 214 grammar (speech models) having a portion set to match the "I want to go to 1010 Diversity Avenue" part of the first pass result and attempting to recognize the remaining part of the speech in order to determine the proper city name (in the form of "X (unknown or don't care)+city name"). In one embodiment, the remaining part of the speech is recognized by comparing such remaining part to a list of cities stored in the grammar database 214.

As to the second example, the dynamic grammar generator 212 analyzes the first pass result "I want to buy a bagel," "I want to buy a table," and "I want to buy a ladle" and determines that the context of the first pass result is food, furniture, or kitchen. That is, the dynamic grammar generator determines the level of the context of the first pass result in a knowledge hierarchy already stored in the grammar database 214 and also determines a category of grammar higher in the knowledge hierarchy than the determined context of the first pass result. As a result, the dynamic grammar generator 212 generates second pass grammar in the categories of food, furniture, and kitchen for application to the speech in the second pass, since food, furniture, and kitchen are categories higher in the knowledge hierarchy than bagel, table, and ladle respectively. Specifically, the second pass grammar for the second example will have a portion set to exactly match the "I want to buy a" part of the speech and attempt to recognize the remaining part of the speech in the food, furniture, or kitchen category. In one embodiment, the remaining part of the speech may be recognized by comparing such remaining part with various words in the food, furniture, or kitchen category.

Then, the speech recognition engine 206 applies 416 the second pass grammar to the speech to recognize 416 the second part of the speech. In this step 416, the input to the speech recognition engine 206 is not limited to the first pass result, according to an embodiment of the present invention. Rather, the speech recognition engine 206 re-recognizes the input speech only as to the second part of the speech regardless of the first pass result, because the second pass grammar already has a portion set to match the first part of the speech.

In another embodiment, the processor 208 may segment only the second part of the speech and input only the segmented second part of the speech to the speech recognition engine 206 for the second pass. This may enhance the efficiency of the speech recognition system of the present invention. In such alternative embodiment, the second pass grammar also corresponds to only the segmented second part of the speech, i.e., the second pass grammar does not have a part corresponding to the first part of the speech.

In the second pass application 416 as to the first example, the speech recognition engine 206 focuses on recognizing only the city name and outputs a list of city names as the second pass recognition result of the present invention. For example, the second pass result output in step 416 for the first example may be in the form of: "X (unknown or don't care)+Palo Alto; "X (unknown or don't care)+Los Altos; "X (unknown or don't care)+Palo Cedros; and "X (unknown or don't care)+Palo Verdes." These four results may be selected by outputting the results having a probability assigned by the speech recognizer above a predetermined probability threshold. It should be clear to one skilled in the art that any number of results may be output as the second pass result depending upon the probability threshold.

In the second pass application 416 as to the second example, the speech recognition engine 206 focuses on recognizing only the object name in the food, furniture, or kitchen category and outputs a list of object names as the second pass recognition result of the present invention. For example, the second pass result output in step 416 for the first example may be in the form of: X (unknown or don't care)+bagel; and "X (unknown or don't care)+table."

The second pass result may also be modified 418 using location-based information input to the processor 208 in the speech recognition system 104, and the modified second pass result is output 420 for use in the third pass of the multiple pass speech recognition method of the present invention. For example, the processor 208 may use GPS information to determine the distance between the current location of the speech recognition system in the vehicle and the city (first example) or store that sell the objects (second example) in the second pass result, and use such distance information to change the weight given to the probabilities of each result output by the second pass or to eliminate certain second pass results. Specifically, the processor 208 may determine that the current location of the vehicle is so far from Los Altos and eliminate Los Altos from the second pass result for the first example, because it is unlikely that the user is asking for directions to a specific address in Los Altos from a location very distant from Los Altos. Similarly, the processor 208 may determine that the current location of the vehicle (e.g., a vacation area) is so unrelated to tables and eliminate table from the second pass result for the second example, because it is unlikely that the user is asking for directions to a location for buying furniture in a vacation area. It should be clear to one skilled in the art that the location-based information may be used in a variety of ways in modifying the second pass results and the example described herein does not limit the manner in which such location-based information can be used in the speech recognition system of the present invention. It should also be clear to one skilled in the art that other types of information such as the user's home address, habits, preferences, and the like may also be stored in memory in the speech recognition system of the present invention and used to modify the second pass results. Further, step 418 is an optional step such that the second pass result may be output 420 without modification 418 based upon the location-based information.

Figure 4C:
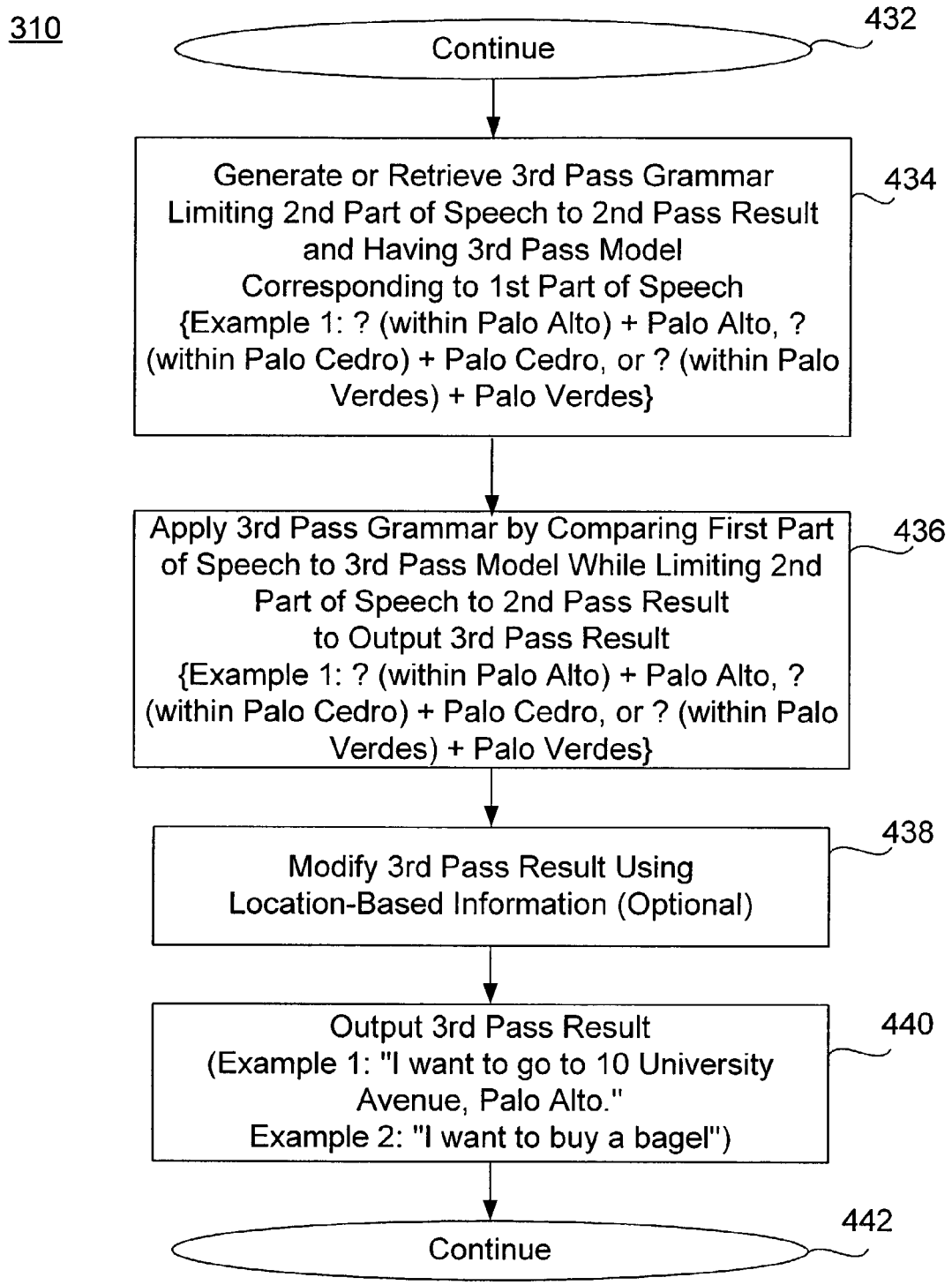
FIG. 4C is a flowchart illustrating in more detail the third pass of the multiple pass speech recognition method according to one embodiment of the present invention.

FIG. 4C is a flowchart illustrating in more detail the third pass 310 of the multiple pass speech recognition method according to an embodiment of the present invention. Referring to FIG. 4C, the third pass receives the second pass result to generate or retrieve 434 appropriate grammar for the third pass. The third pass grammar limits the second part of the speech to the second pass results and has a third pass model corresponding to the first part of the speech. The third pass model is configured to vary only within the second pass result and corresponds to a level lower in the knowledge hierarchy than the second pass result and the second pass grammar. For example, the third pass grammar limits the city names in the first example herein to the second pass result (e.g., Palo Alto, Palo Cedro, and Palo Verdes in the first example) and the third pass model varies the respective street numbers and street names in the first part of the speech among the street numbers and street names located within such cities determined in the second pass. The second example does not have a level lower in the knowledge hierarchy than the second pass result "bagel," and thus does need a third pass grammar. The third pass grammar is generated or retrieved from the grammar database 214 by the dynamic grammar generator 212. In an alternative embodiment, the processor 208 may also segment only the first part of the speech and input only this segmented first part of the speech to the speech recognition engine 206 for comparison with the third pass model in the third pass. This may enhance the efficiency of the speech recognition system of the present invention. In such alternative embodiment, the third pass grammar also corresponds to only the first part of the speech, i.e., the third pass grammar does not have a part corresponding to second the part of the speech.

Once the third pass grammar is generated or retrieved 434, it is applied 436 to the speech by the speech recognition engine 206 in cooperation with the processor 208 in order to recognize the first part of the speech. Application 436 of the third pass grammar to the speech is done by comparing the first part of the speech to the third pass model of the third pass grammar while limiting the second part of the speech to the second pass results. For example, the first part of the speech ("I want to go to 10 University Avenue" or "X" above in the first example) is compared with the sound (third pass model) corresponding to a list of street numbers and street names (e.g., University Avenue, Diversity Avenue, Main Avenue, etc.) located within the cities (Palo Alto, Palo Cedro, and Palo Verdes) determined in the second pass. Since the number of street addresses in the third pass grammar is limited to the street addresses located within a few cities determined in the second pass, speech recognition techniques that are more accurate but require more processing speed may be used in order to recognize the street address. Therefore, the multiple pass speech recognition method of the present invention is more accurate and effective in speech recognition than conventional speech recognition methods.

The third pass result output in step 436 may be one or more statements that the multiple pass speech recognition method of the present invention estimates the input speech to mean. For example, the third pass result may include two statements "I want to go to 10 University Avenue, Palo Alto" and "I want to go to 10 Diversity Avenue, Palo Alto." This third pass result may also be modified 438 using location-based information input to the processor 208 in the speech recognition system 104, and the modified third pass result is output 440 as the final result output by the multiple pass speech recognition method of the present invention. For example, the processor 208 may use GPS information to determine the distance between the current location of the speech recognition system 104 in the vehicles and the street address/city in the third pass result and use such distance information to change the weight given to the probabilities of each statement in the third pass results or to eliminate certain statements. Specifically, the processor 208 may determine that the current location of the vehicle is so far from 10 Diversity Avenue in Palo Alto and thus eliminate "I want to go to 10 Diversity Avenue, Palo Alto" from the third pass result, because it is unlikely that the user is asking for directions to such location having an address very distant from the current location of the vehicle. It should be clear to one skilled in the art that the location-based information may be used in a variety of ways in modifying the third pass results and the example described herein does not limit the manner in which such location-based information can be used in the speech recognition system of the present invention. It should also be clear to one skilled in the art that other types of information such as the user's home address, habits, preferences, and the like may also be stored in the speech recognition system of the present invention and used to modify the third pass results. Further, step 438 is an optional step and the third pass result may be output 440 without modification 438 based upon the location-based information. Finally, the process continues 442 to output 312 the third pass result "I want to go to 10 University Avenue Palo Alto" for the first example or "I want to buy bagel" for the second example as the final speech recognition result according to the multiple pass speech recognition system of the present invention. This final speech recognition result may also be converted to various control signals for inputting to other electronic devices, such as the navigation system 106.

Although the present invention has been described above with respect to several embodiments, various modifications can be made within the scope of the present invention. For example, the two or three pass speech recognition method described in FIGS. 3 and 4A–4C may be modified to include even more passes. To this end, the grammar in each pass of the multiple pass speech recognition method may attempt to recognize smaller parts of the speech such that the entire speech will be recognized in smaller parts and thus in more passes. Each grammar corresponding to each passes in the multiple pass speech recognition method may correspond to a different level in the knowledge hierarchy. The number of passes (two or three) described herein with regard to the multiple pass speech recognition system of the present invention does not limit the scope of the invention.

Furthermore, the methods described in FIGS. 3 and 4A–4C can be embodied in software stored in a computer readable medium or in hardware having logic circuitry configured to perform the method described therein. The division of intelligence between the client device and the server in a networked speech recognition system illustrated in FIG. 2C can be modified in any practically appropriate manner. Accordingly, the disclosure of the present invention is intended to be illustrative, but not limiting, of the scope of the invention, which is set forth in the following claims.

What is claimed is:

1. A method of recognizing speech, the method comprising:
   receiving an input speech signal;
   performing an initial recognition on the input speech signal to generate a first pass result;
   generating a first grammar based upon the first pass result, the first grammar having a portion set to match a first part of the input speech signal; and
   applying the first grammar to the input speech signal to generate a second pass result, wherein generating a first grammar comprises;
   determining a context of the first pass result;
   determining the portion of the first grammar to be set to match the first part of the input speech signal based upon the determined context of the first pass result; and
   generating the first grammar with the portion set to match the first part of the input speech signal.

2. The method of claim 1, wherein applying the first grammar comprises;
   setting the first part of the input speech signal as matched with the portion of the first grammar;
   recognizing a second part of the input speech signal;
   generating the second pass result based upon the recognized second part of the input speech signal.

3. The method of claim 2, wherein the second pass result is modified based upon location-based information.

4. The method of claim 2, wherein the first part of the input speech signal corresponds to a street address and the second part of the input speech signal corresponds to a city name.

5. A method of recognizing speech, the method comprising:
receiving an input speech signal;
performing an initial recognition on the input speech signal to generate a first pass result;
generating a first grammar based upon the first pass result, the first grammar having a portion set to match a first part of the input speech signal;
applying the first grammar to the input speech signal to generate a second pass result;
generating a second grammar based upon the second pass result, the second grammar limiting the second part of the input speech signal to the second pass result and configured to recognize the first part of the input speech signal within the second pass result; and
applying the second grammar to the input speech signal to generate a third pass result.

6. The method of claim 5, wherein generating a second grammar comprises:
limiting the second part of the input speech signal to the second pass result; and
generating a model corresponding to the first part of the input speech signal and varying within the second pass result.

7. The method of claim 6, wherein applying the second grammar comprises comparing the first part of the input speech signal to the model while the second part of the input speech signal is limited to the second pass result.

8. The method of claim 5, wherein the third pass result is modified based upon location-based information.

9. A computer program product for recognizing speech, the computer program product stored on a computer readable medium and adapted to perform a method comprising:
receiving an input speech signal;
performing an initial recognition on the input speech signal to generate a first pass result;
generating a first grammar based upon the first pass result, the first grammar having a portion set to match a first part of the input speech signal; and
applying the first grammar to the input speech signal to generate a second pass result,
wherein generating a first grammar comprises;
determining a context of the first pass result;
determining the portion of the first grammar to be set to match the first part of the input speech signal based upon the determined context of the first pass result; and
generating the first grammar with the portion set to match the first part of the input speech signal.

10. The computer program product of claim 9, wherein applying the first grammar comprises:
setting the first part of the input speech signal as matched with the portion of the first grammar;
recognizing a second part of the input speech signal; and
generating the second pass result based upon the recognized second part of the input speech signal.

11. The computer program product of claim 10, wherein the second pass result is modified based upon location-based information.

12. The computer program product of claim 10, wherein the first part of the input speech signal corresponds to a street address and the second part of the input speech signal corresponds to a city name.

13. A computer program product for recognizing speech, the computer program product stored on a computer readable medium and adapted to perform a method comprising:
receiving an input speech signal;
performing an initial recognition on the input speech signal to generate a first pass result;
generating a first grammar based upon the first pass result, the first grammar having a portion set to match a first part of the input speech signal; and
applying the first grammar to the input speech signal to generate a second pass result;
generating a second grammar based upon the second pass result, the second grammar limiting the second part of the input speech signal to the second pass result and configured to recognize the first part of the input speech signal within the second pass result; and
applying the second grammar to the input speech signal to generate a third pass result.

14. The computer program product of claim 13, wherein generating a second grammar comprises:
limiting the second part of the input speech signal to the second pass result; and
generating a model corresponding to the first part of the input speech signal and varying within the second pass result.

15. The computer program product of claim 14, wherein applying the second grammar comprises comparing the first part of the input speech signal to the model while the second part of the input speech signal is limited to the second pass result.

16. The computer program product of claim 13, wherein the third pass result is modified based upon location-based information.

17. A speech recognition system using a multiple pass speech recognition method including at least a first pass and a second pass, the speech recognition system comprising
a speech recognition engine for performing an initial recognition on an input speech signal in the first pass to generate a first pass result and applying a first grammar to the input speech signal in the second pass to generate a second pass result;
a grammar database for storing a plurality of grammar; and
a dynamic grammar generator for generating the first grammar based upon the first pass result using the grammar stored in the grammar database, the first grammar having a portion set to match a first part of the input speech signal and configured to recognize a second part of the input speech signal,
wherein the dynamic grammar generator determines a context of the first pass result and determines the portion of the first grammar to be set to match the first part of the input speech signal based upon the determined context of the first pass result.

18. The speech recognition system of claim 17, further comprising a processor coupled to the speech recognition engine and configured to modify the second pass result based upon location-based information.

19. The speech recognition system of claim 17, wherein the first part of the input speech signal corresponds to a street address and the second part of the input speech signal corresponds to a city name.

20. The speech recognition system of claim 17, wherein the speech recognition system is networked and includes a server and a client, the client comprising the speech buffer and the server comprising the speech recognition engine, the dynamic grammar generator, and the grammar database.

21. The speech recognition system of claim 17, wherein the speech recognition system is networked and includes a server and a client, the client comprising the speech buffer and the speech recognition engine, and the server comprising the dynamic grammar generator, and the grammar database.

22. A speech recognition system using a multiple pass speech recognition method including at least a first pass and a second pass, the speech recognition system comprising:
a speech recognition engine for performing an initial recognition on an input speech signal in the first pass to generate a first pass result and applying a first grammar to the input speech signal in the second pass to generate a second pass result;
a grammar database for storing a plurality of grammar; and
a dynamic grammar generator for generating the first grammar based upon the first pass result using the grammar stored in the grammar database, the first grammar having a portion set to match a first part of the input speech signal and configured to recognize a second part of the input speech signal,
wherein the multiple pass speech recognition method further comprises a third pass,
the dynamic grammar generator generating a second grammar based upon the second pass result, the second grammar limiting the second part of the speech to the second pass result and configured to recognize the first part of the input speech signal within the second pass result; and
the speech recognition engine applying the second grammar to the input speech signal to generate a third pass result.

23. The speech recognition system of claim 22, wherein the dynamic grammar generator limits the second part of the input speech signal to the second pass result and generates a model corresponding to the first part of the input speech signal and varying within the second pass result as part of the second grammar.

24. The speech recognition system of claim 23, wherein the speech recognition engine applies the third pass grammar to the input speech signal in the third pass by comparing the first part of the input speech signal to the model while limiting the second part of the input speech signal to the second pass result.

25. The speech recognition system of claim 22, further comprising a processor coupled to the speech recognition engine configured to modify the third pass result based upon location-based information.

26. A method of recognizing speech, the method comprising:
receiving an input speech signal;
performing an initial recognition on the input speech signal to generate a first pass result;
determining a level of the first pass result in a knowledge hierarchy; and
generating a first grammar having a level higher in the knowledge hierarchy than the level of the first pass result, the second pass grammar having a portion set to match a first part of the input speech signal; and
applying the first grammar to the input speech signal to generate a second pass result.

27. The method of claim 26, wherein generating a first grammar comprises:
determining the portion of the first grammar to be set to match the first part of the input speech signal based upon the determined level of the first pass result; and
generating the first grammar having the portion set to match the first part of the input speech signal.

28. The method of claim 26, wherein applying the first grammar comprises:
setting the first part of the input speech signal as matched with the portion of the first grammar;
recognizing a second part of the input speech signal; and
generating the second pass result based upon the recognized second part of the input speech signal.

29. The method of claim 28, wherein the first part of the input speech signal corresponds to a street address and the second part of the input speech signal corresponds to a city name.

30. The method of claim 26, wherein the second pass result is modified based upon location-based information.

31. The method of claim 26, further comprising:
generating a second grammar based upon the second pass result, the second grammar having a level lower in the knowledge hierarchy than both the level of the second pass result and the level of the first grammar, the second grammar limiting the second part of the input speech signal to the second pass result and configured to recognize the first part of the input speech signal within the second pass result; and
applying the second grammar to the input speech signal to generate a third pass result.

32. The method of claim 31, wherein generating a second grammar comprises:
limiting the second part of the input speech signal to the second pass result;
generating a model corresponding to the first part of the input speech signal and varying within the second pass result.

33. The method of claim 31, wherein applying the second grammar comprises comparing the first part of the input speech signal to the model while the second part of the input speech signal is limited to the second pass result.

34. The method of claim 31, wherein the third pass result is modified based upon location-based information.

35. A server for use in a networked speech recognition system using a multiple pass speech recognition method including at least a first pass and a second pass for recognition of an input speech signal, the server comprising:
a grammar database for storing a plurality of grammar; and
a dynamic grammar generator for generating a first grammar based upon a result of the first pass using the grammar stored in the grammar database, the first grammar having a portion set to match a first part of the input speech signal and configured to recognize a second part of the input speech signal,
wherein the dynamic grammar generator further generates a second grammar based upon a result of the second pass, the second grammar limiting the second part of the input speech signal to the result of the second pass and configured to recognize the first part of the input speech signal within the result of the second pass result.

* * * * *

UNITED STATES PATENT AND TRADEMARK OFFICE
CERTIFICATE OF CORRECTION

| | | |
|---|---|---|
| PATENT NO. | : 7,184,957 B2 | |
| APPLICATION NO. | : 10/269269 | |
| DATED | : February 27, 2007 | |
| INVENTOR(S) | : John R. Brookes and Norikazu Endo | |

It is certified that error appears in the above-identified patent and that said Letters Patent is hereby corrected as shown below:

Abstract

Line 7, after "method may further include a third pass" add --that generates third pass--.

Signed and Sealed this

Fifteenth Day of May, 2007

JON W. DUDAS
*Director of the United States Patent and Trademark Office*